United States Patent
Meyer et al.

(10) Patent No.: US 9,576,266 B2
(45) Date of Patent: Feb. 21, 2017

(54) MATERIAL HARMONIZATION DISPOSITION SYSTEM FOR ELECTRONIC INVENTORIES

(71) Applicant: UNITED AIRLINES, INC., Chicago, IL (US)

(72) Inventors: Fred Meyer, Castro Valley, CA (US); Thao Phan, Belmont, CA (US); Edward F. Pozzi, Jr., San Carlos, CA (US)

(73) Assignee: UNITED AIRLINES, INC., Chicago, IL (US)

(*) Notice: Subject to any disclaimer, the term of this patent is extended or adjusted under 35 U.S.C. 154(b) by 530 days.

(21) Appl. No.: 13/844,539

(22) Filed: Mar. 15, 2013

(65) Prior Publication Data
US 2014/0279295 A1   Sep. 18, 2014

(51) Int. Cl.
G06Q 10/00 (2012.01)
G06Q 10/08 (2012.01)
G06F 17/30 (2006.01)

(52) U.S. Cl.
CPC ....... *G06Q 10/087* (2013.01); *G06F 17/30563* (2013.01)

(58) Field of Classification Search
CPC ..... G06Q 10/087; G06Q 20/203; G06Q 10/00
USPC ..................................... 705/28, 22
See application file for complete search history.

(56) References Cited

U.S. PATENT DOCUMENTS

| | | | |
|---|---|---|---|
| 6,532,481 B1* | 3/2003 | Fassett, Jr. | G06F 17/30067 |
| 7,739,227 B2* | 6/2010 | Jordan | G06F 17/30306 707/600 |
| 7,979,313 B1* | 7/2011 | Baar | 705/26.1 |
| 8,001,019 B2* | 8/2011 | Phelan | G06F 21/629 705/1.1 |
| 8,694,429 B1* | 4/2014 | Ballaro et al. | 705/40 |
| 2002/0023261 A1* | 2/2002 | Goodwin et al. | 717/146 |
| 2002/0032611 A1* | 3/2002 | Khan | G06Q 10/06 705/26.1 |
| 2004/0039646 A1* | 2/2004 | Hacker | 705/22 |
| 2004/0225390 A1* | 11/2004 | Keller et al. | 700/95 |
| 2007/0294149 A1* | 12/2007 | Lu et al. | 705/28 |
| 2008/0281792 A1* | 11/2008 | Pickett et al. | 707/3 |
| 2009/0144129 A1* | 6/2009 | Grouf et al. | 705/10 |
| 2012/0130927 A1* | 5/2012 | Shimogori | G06N 99/005 706/12 |

\* cited by examiner

Primary Examiner — Seye Iwarere
(74) Attorney, Agent, or Firm — Marshall, Gerstein & Borun LLP

(57) ABSTRACT

A material harmonization disposition system is provided to harmonize disparate material databases by identifying volumes of common database inventory parts and operating as a database authorizing tool for declaring and recording common inventory parts in categorized manner for disposition.

25 Claims, 16 Drawing Sheets

MATERIAL HARMONIZATION DISPOSITION SYSTEM FOR ELECTRONIC INVENTORIES

BACKGROUND OF THE DISCLOSURE

Field of the Disclosure

The disclosure relates generally to managing electronic inventories and, more particularly, to harmonizing different inventories, such as legacy inventories.

Brief Description of Related Technology

Increasingly, as data becomes more prevalent, databases increase in size, making integration across databases quite challenging. This is particularly true for legacy databases for many corporate enterprises, which themselves rely upon numerous different databases some with partially overlapping information. Legacy databases are not only relatively mature, they are often the result of a years of merging disparate databases together, as database management systems change, as enterprises merge and acquire other enterprises requiring merging of data, etc. Conventional techniques of integrating such databases are quite challenging, in terms of logistics, as well in terms of time and resources.

SUMMARY OF THE DISCLOSURE

The present techniques provides a system for database harmonization that effectively and, in an automated way, compares and harmonizes databases, while maintaining data integrity. In some examples, the techniques are applied to inventory data storage databases, and in particular those used in mission critical enterprises, such as transportation, and specifically aircraft materials, parts, and services databases. These databases can require greater levels of integrity and regulatory considerations that challenge conventional harmonization processes.

In accordance with one aspect of the disclosure, a method of harmonizing databases, the method comprises: accessing, using a harmonization system, first inventory data stored in a first database, the first inventory data comprising a plurality of first inventory identifiers; accessing, using the harmonization system, second inventory data stored in a second database, the second inventory data comprising a plurality of second inventory identifiers, wherein the plurality of first inventory identifiers and the plurality of second inventory identifiers have different formats; analyzing, in the harmonization system, the first inventory data against the second inventory data and assigning a harmonization category value to each entry in the first inventory data, the harmonization category value indicating (i) an entry in the first inventory data that may be harmonized with one or more entries in the second inventory data, (ii) an entry in the first inventory data that may not be harmonized with any entry in the second inventory data, and (iii) an entry that may be conditionally harmonized with one or more entries in the second inventory data; in response to the assigned harmonization category value, forming harmonization database entries containing the entries assigned harmonization category value (i) and/or (ii); and visually depicting, using the harmonization system, an indication for at least those entries having the harmonization category value (iii) in a graphical display, for subsequent conditional harmonization treatment.

In accordance with another aspect of the disclosure, a computer-readable storage medium having stored thereon a set of instructions, executable by a processor, for harmonizing databases, the instructions comprise: instructions for accessing first inventory data stored in a first database, the first inventory data comprising a plurality of first inventory identifiers; instructions for accessing second inventory data stored in a second database, the second inventory data comprising a plurality of second inventory identifiers, wherein the plurality of first inventory identifiers and the plurality of second inventory identifiers have different formats; instructions for analyzing the first inventory data against the second inventory data and assigning a harmonization category value to each entry in the first inventory data, the harmonization category value indicating (i) an entry in the first inventory data that may be harmonized with one or more entries in the second inventory data, (ii) an entry in the first inventory data that may not be harmonized with any entry in the second inventory data, and (iii) an entry that may be conditionally harmonized with one or more entries in the second inventory data; instructions for, in response to the assigned harmonization category value, forming harmonization database entries containing the entries assigned harmonization category value (i) and/or (ii); and instructions for visually depicting, using the harmonization system, an indication for at least those entries having the harmonization category value (iii) in a graphical display, for subsequent conditional harmonization treatment.

In accordance with another aspect of the disclosure, a system for harmonizing databases, the system comprises: a communication network; a plurality of inventory databases communicatively coupled to the communication network; a harmonization system communicatively coupled to the communication network to receive a plurality of different inventory data sets from the plurality of inventory databases, wherein the harmonization system is configured to, identify from the plurality of different inventory data sets, inventory identifiers for respective inventory items in the plurality of different inventory data sets, wherein each inventory identifier identifies a different entry in one of the plurality of different inventory data sets, and analyze the inventory identifiers and assign a harmonization category value to each entry in the plurality of different inventory data sets, the harmonization category value indicating (i) an entry that may be harmonized with one or more other entries in the plurality of different inventory data sets, (ii) an entry that may not be harmonized with any other entry in the plurality of different inventory data sets, and (iii) an entry that may be conditionally harmonized with one or more other entries in the plurality of different inventory data sets; and a harmonization database for storing harmonization database entries containing the entries assigned harmonization category value (i), (ii) and/or (iii).

BRIEF DESCRIPTION OF THE DRAWING FIGURES

For a more complete understanding of the disclosure, reference should be made to the following detailed description and accompanying drawing figures, in which like reference numerals identify like elements in the figures, and in which.

Figure 1:
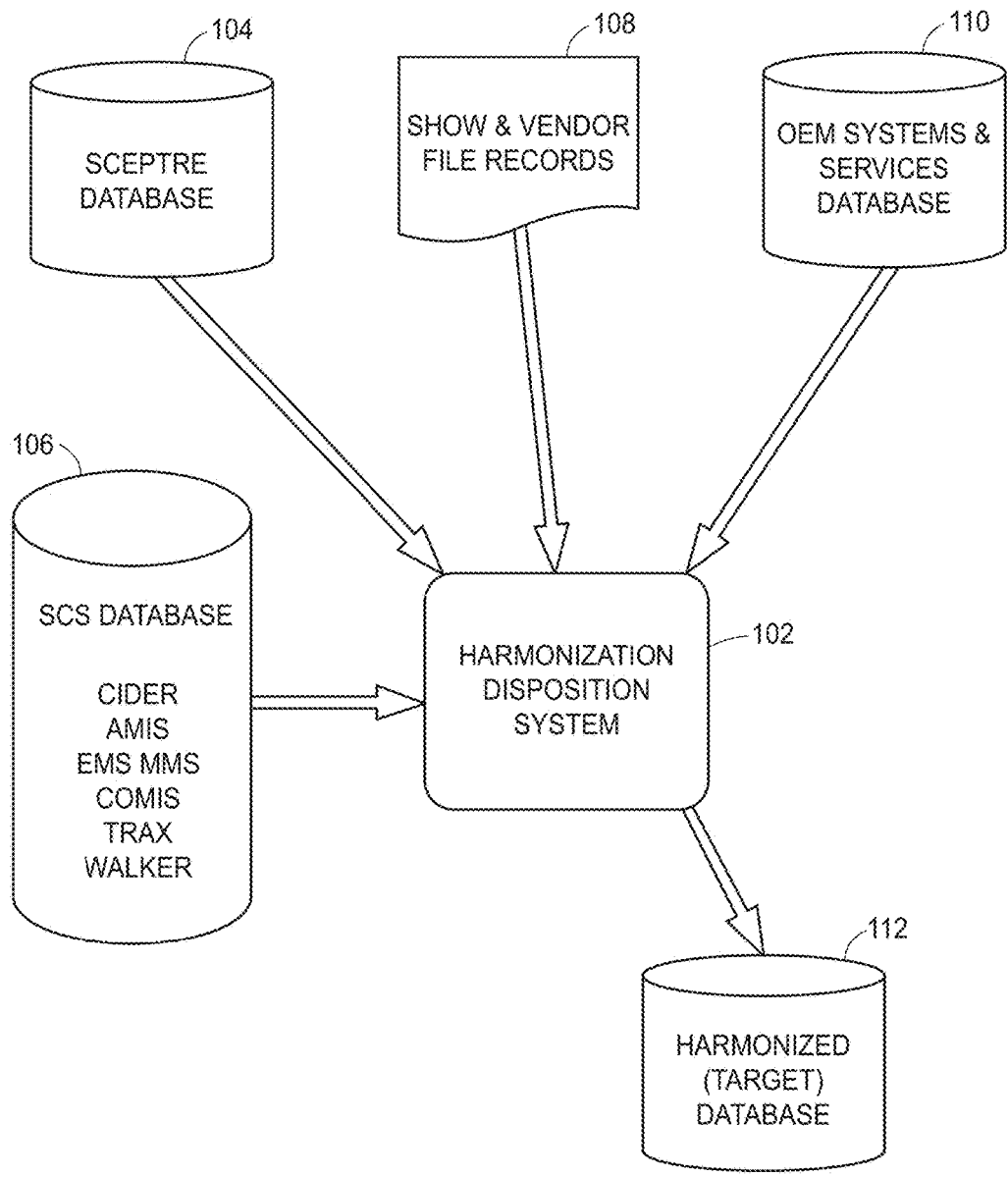
FIG. 1 illustrates a high level materials harmonization process flow as may be implemented on numerous different database types, in accordance with an example.
Figure 2:
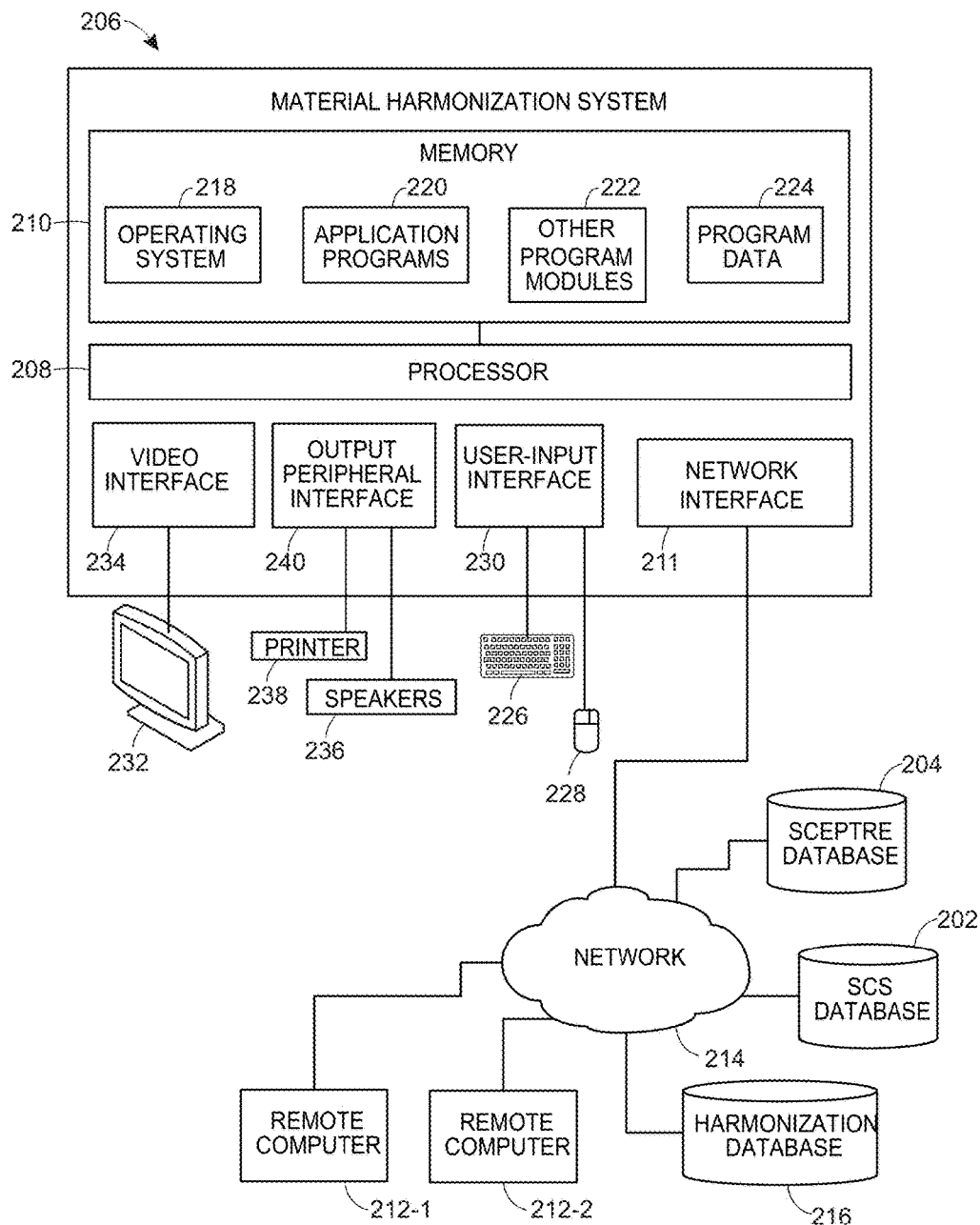
FIG. 2 illustrates a block diagram of a material harmonization system that may operate in accordance with an example.
Figure 13:
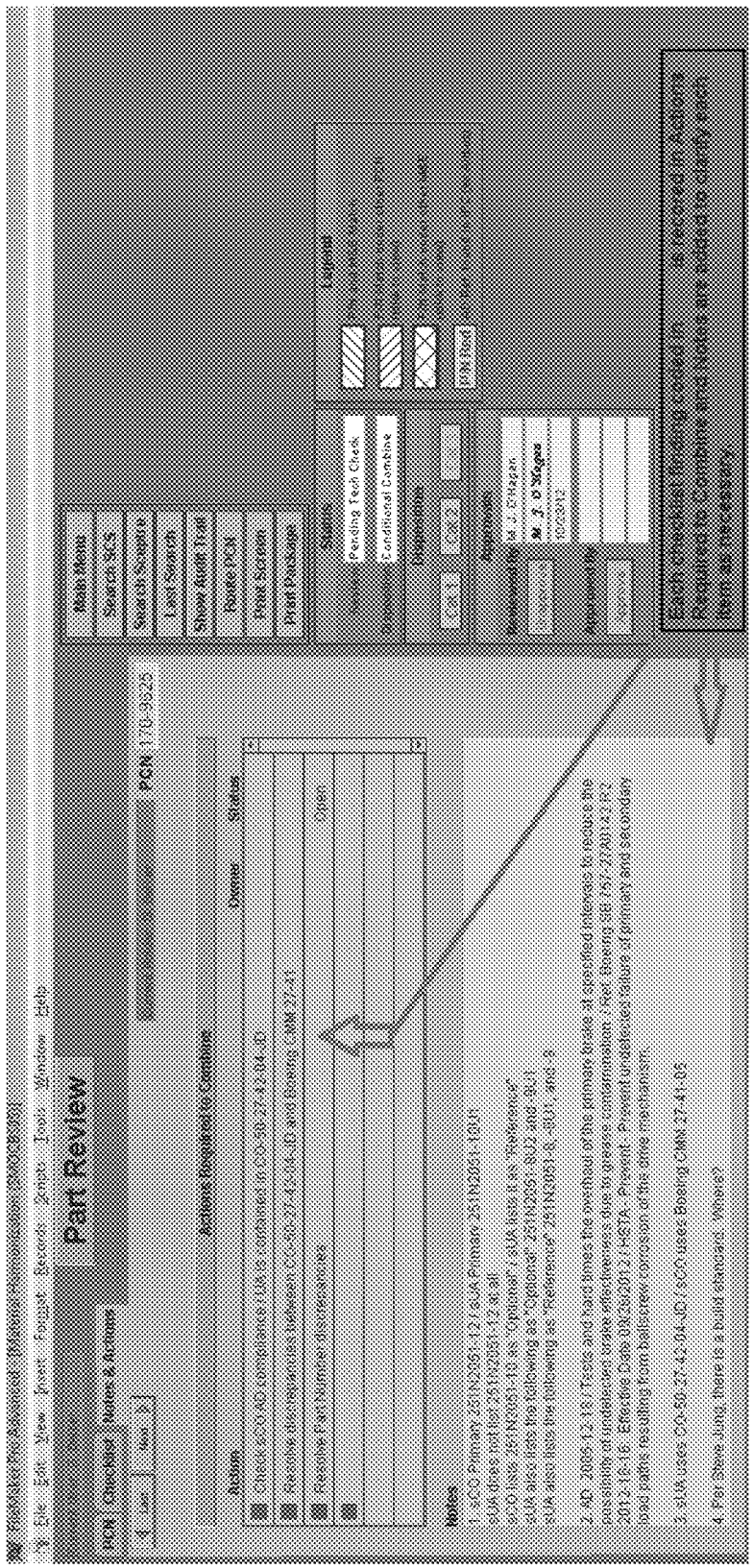
Figure 14:
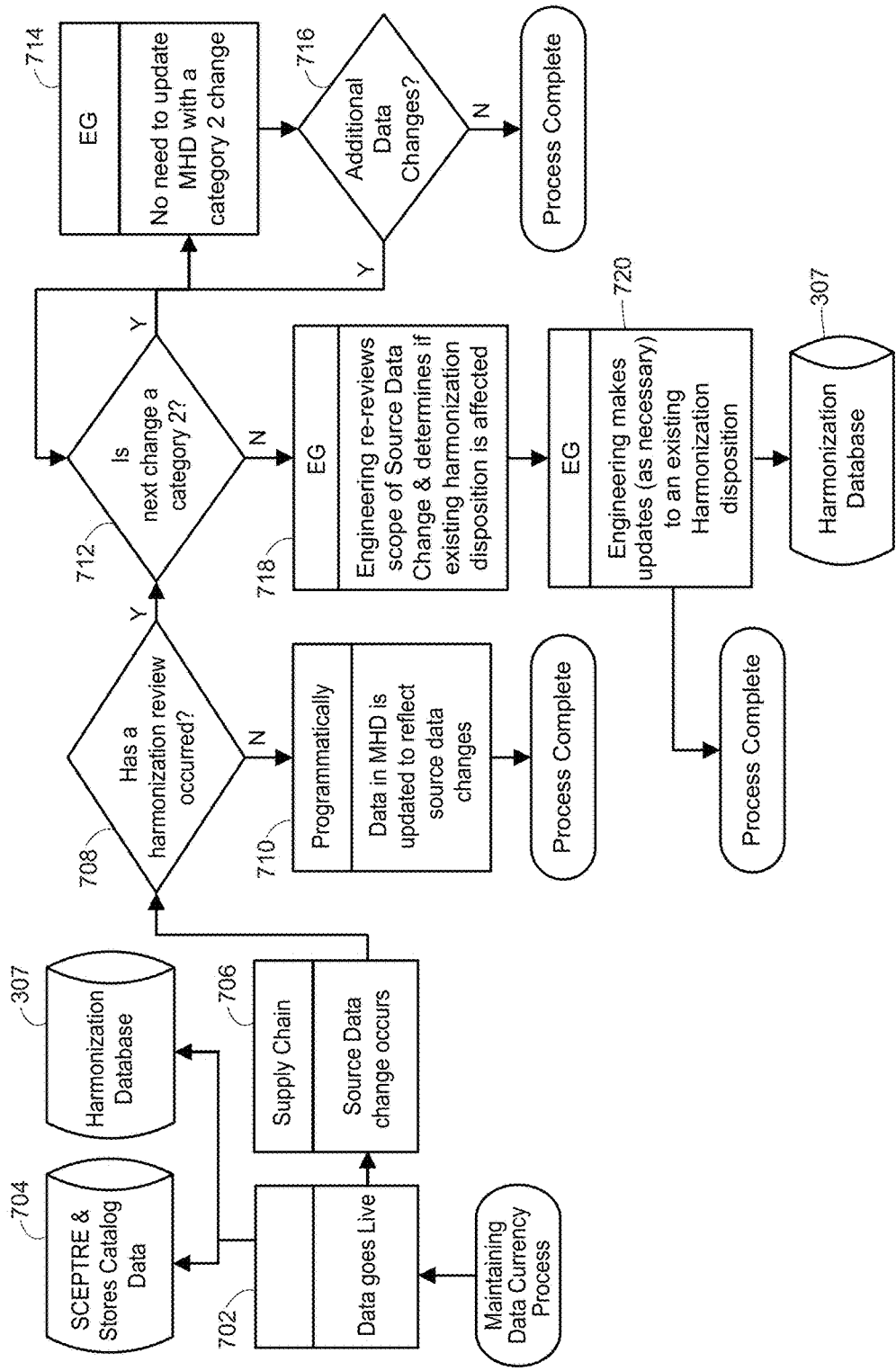

FIG. 13 is another example depiction of a graphical display generated by the system of FIG. 2 to display notes and actions to a user, in accordance with an example; and FIG. 14 is a data and information process flow diagram as may be implemented by the material harmonization system of FIG. 1 for periodically updating a material harmonization database with changed information, in accordance with an example.

While the disclosed methods and apparatuses are susceptible of embodiments in various forms, there are illustrated in the drawing (and will hereafter be described) specific embodiments of the invention, with the understanding that the disclosure is intended to be illustrative, and is not intended to limit the invention to the specific embodiments described and illustrated herein.

DETAILED DESCRIPTION

Generally, the present techniques provide a system for harmonizing information stored across various related and unrelated databases, and more specifically inventory parts, materials, and services information stored in those databases. In some examples, a material harmonization system accesses native databases and automatically categorizes inventory database information, identifying common inventory parts or inventory part datasets across the native databases. The harmonization system is able to assess categorized inventory data for applying an automatic disposition to certain data, e.g., by combining such data into a target database, such as a material harmonization database. While for other categorized inventory data, the harmonization system is able to automatically flag such data for follow-up disposition by an engineer or other designated authorizing personnel. In such examples, the harmonization database is able to automatically facilitate engineering disposition by compiling, from the native databases, detailed inventory parts information, such as product material or part specifications, including qualities affecting airworthiness requirements, design specifications, and form, fit, and function, part numbers, nomenclatures, for review and assessment. From here the disposition tool not only performs harmonization on identified inventory parts, but also provides intelligent project report tracking for recording, validation, and modification purposes.

FIG. 1 provides an example materials harmonization process flow 100 as applied to materials databases used an example aircraft/air flight enterprise scenario. In the illustrated example, a harmonization disposition system 102 accesses and receives data from various databases, including a first inventory database 104 in the form of a SCEPTRE database, which is an ORACLE platform parts, materials, and services database, and including a second inventory database 106 in the form of a Stores Catalog System (SCS) database 106.

Either of these native databases 104 and 106 may be formed of other databases or storage systems and in that way may reflect a distributed database architecture. In some examples, the second inventory database 106 represents a collection of databases or computer systems, which may include some or all of the following: AMIS—Component on Airplane Tracking, Inspections, Removal Data; CIDER—Component Reliability; COMIS—Life Limits, Master Inventory Record (MIR) COMIS includes links to AMIS and CIDER; TRAX—Maintenance Programs; Walker—Repair Orders, Purchase Orders, Receiving; COSMO—Stores Catalog System (ordering system) COSMO data is downloaded into FileMaker Pro; CCR— Component Certification Requirements CCR cross references the component to OEM specifications; and FileMaker Pro—Stores Catalog System, Shelf Life, Engineering Documents, MHO Engineering documentation includes AD and Regulatory Compliance data; E-Docs—Engineering Documents and List of Online Documents, where the engineering documentation includes AD and Regulatory compliance information as well as customized AMM, CMM, IPC, EIPC and other maintenance documents; TICS—Tool Inventory Control System; and an EMS—Engine Component on Engine Tracking, Inspections, and Removal Data.

In some examples, the first inventory database 104 represents a collection of databases or computer systems, which may include some or all of the following: SCEPTRE—Maintenance Data, Records, Tracking; E-Docs—Engineering Documents and List of Online Manuals; and e-TIPS—Tool Information Planning System.

The harmonization disposition system 102 may also access shop and vendor file records systems 108, for example, from individual facilities in an enterprise, such as plants, warehouses, shops, etc. and OEM systems and services databases 110, such as those maintained by parts manufacturers like Boeing, Airbus, industry standards reference resources, including Information Handling Systems (IHS), Military Specifications, SAE, MMPDS, etc, and regulatory agencies like the Federal Aviation Administration (FAA).

In an example, the harmonization disposition system 102 collects inventory data from these database and records resources and harmonizes that information into a target database 112, which may be a separate database or may be represent one of the original native databases into which inventory from the other sources is to be collected.

FIG. 2 illustrates an example implementation of a harmonization system like that of FIG. 1 in form of a material harmonization environment 200 for harmonizing aircraft/airline databases, specifically an SCS database 202 and a SCEPTRE database 204. The techniques described herein may be coded in software, hardware, firmware, or combination thereof, for execution on a material harmonization computing device 206. Generally, FIG. 2 illustrates an example of a suitable computing system environment 200 to harmonize databases between United Air Lines (SCS database 202) and Continental Air Lines (SCEPTRE database 204) and.

In an example, the SCS database 202 and the SCEPTRE database 204 each respectively contain inventory and related maintenance program data for specific parts, materials, and services. Some of the data may have been originally collected in paper or hard copy form and entered into the system. While others of the data were automatically populated and formatted into the database 202 from external databases and computer systems. The database 202 may contain various types of data specific to inventory parts, including, by way of example, and not limitation, manufacturer parts numbers, assigned customer side parts control numbers (PCNs), assigned Manufacturing & Engineering (M&E) numbers, shelf life data, any airworthiness limitation instructions, maintenance history, repair history, costs, numbers of parts, associated parts, location identifiers, storage bin/lot identifiers, other supply chain data, including Part/Component Resource Codes which determines how the part is recorded and tracked if necessary, and Hazmat status. More generally, the SCS database 202 and the SCEPTRE database 204 may contain any inventory parts identifying information that may be used to uniquely identify parts, materials, and services for harmonization purposes. It should be noted that the computing system environment 200 is only one example of a suitable computing environment and is not intended to suggest any limitation as to the scope of use or functionality of the method and apparatus of the claims.

An exemplary system for implementing the blocks of the techniques described herein includes a general-purpose computing device in the form of the material harmonization computer 206. Components of computer 206 may include, but are not limited to, a processing unit 208 and a system memory 210. The computer 206 may operate in a networked environment, through network interface 211, and using logical connections to the databases 202 and 204 and one or more remote computer systems, 212-1, 212-2, via network 214. The network 214 may represent, in some examples, a local area network (LAN), a wide area network (WAN), a combination of the two, and includes proprietary and non-proprietary networks, whether wireless or wired or some combination thereof. Other networks include a cloud based network and the Internet.

The remote computers 212-1, 212-2, may include other computers like the harmonization computer 206, but in some examples, these remote computers 212-1, 212-2, include one or more of a parts management system, maintenance system, repair system, and procurement system.

Also connected to the harmonization computer 206 through the network 214 is a material harmonization database 216 for storing harmonized inventory parts from the computer 206.

The harmonization computer 206 typically includes a variety of computer readable media that may be any available media that may be accessed by computer 206 and includes both volatile and nonvolatile media, removable and non-removable media. The system memory 210 includes computer storage media in the form of volatile and/or nonvolatile memory such as read only memory (ROM) and random access memory (RAM). The ROM may include a basic input/output system (BIOS). RAM typically contains data and/or program modules that include operating system 218, application programs 220, other program modules 222, and program data 224. The computer 206 may also include other removable/non-removable, volatile/nonvolatile computer storage media such as a hard disk drive, a magnetic disk drive that reads from or writes to a magnetic disk, and an optical disk drive that reads from or writes to an optical disk.

A user may enter commands and information into the computer 206 through input devices such as a keyboard 226 and pointing device 228, commonly referred to as a mouse, trackball or touch pad. Other input devices (not illustrated) may include a microphone, joystick, game pad, satellite dish, scanner, or the like. These and other input devices are often connected to the processing unit 208 through a user input interface 230 that is coupled to a system bus, but may be connected by other interface and bus structures, such as a parallel port, game port or a universal serial bus (USB). A monitor 232 or other type of display device may also be connected to the processor 208 via an interface, such as a video interface 234. In addition to the monitor, computers may also include other peripheral output devices such as speakers 236 and printer 238, which may be connected through an output peripheral interface 240.

Generally, the techniques herein may be coded in a query language such as SQL, .QL, CQL, D, DMX, Datalog, HTSQL, ISBL, LINQ MDX, OQL, OCL, OttoQL, QUEL, RDQL, Slick, LINQ, SPARDL, SPL, TMQL, UnQL, XQuery, for querying relational and other structured as well as unstructured databases. In some examples, the techniques herein may be implemented in a scripting language. Generally, the harmonization computer 206 may store and execute commands in any other computing language suitable of accessing databases and for comparison of data contained therein. For example, once a harmonization disposition tool is loaded on to the computer 206, the program may be executed on the databases 202 and 204. Accessed data may be loaded on to the memory 210 or onto the memory of any of the computer storage devices, including the remote computers 212-1 and 212-2. Once generated, the harmonization algorithms applied herein, which may take the form of a large set of if-then conditions, and other comparisons that may then be coded using any general computing language for test implementation. For example, the conditions can be captured using C/C++ and compiled to produce an executable, which, when run, provides instructions for harmonization as described hereinbelow, including automated processes and audits of the user interactions with the system 200. The output of the executable program may be displayed on a display (e.g., the monitor 232), sent to the printer 238, stored for later use by the computer 206, or offloaded to another system, such as one of the remote computers 212-1, 212-2.

While the techniques discussed herein provide examples implemented to harmonize selected databases, more broadly, the techniques may be used in any harmonization context in which data sets are likely to have duplicative entries, bearing the same or differing identifiers. Further still, while the techniques are described for disposition purposes, to harmonize various databases, the techniques may be implemented as part of an automated maintenance, procurement, and/or repair workflow, where harmonization is integrated into any such existing automated systems.

Figure 3:
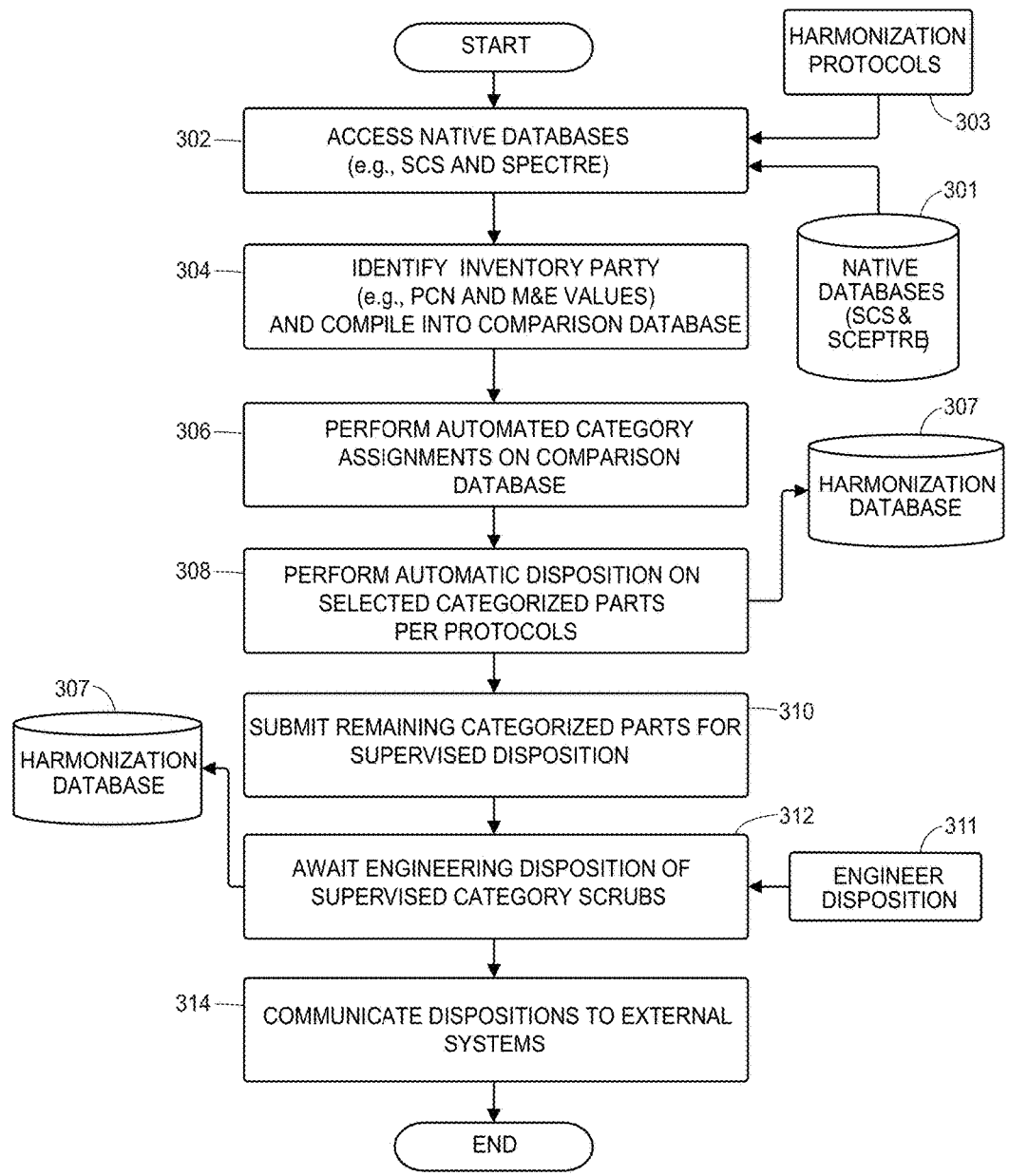
FIG. 3 is a data and information process flow diagram as may be implemented by the material harmonization system of FIG. 1 for performing automated and engineering disposition on inventory data, in accordance with an example.

FIG. 3 illustrates an example process 300 for harmonizing databases (e.g., the SCS and SCEPTRE databases 202 and 204, respectively) and as may be executed on the harmonization system 200. The system 200, at a block 302 accesses native inventory parts databases collectively represented as 301, for example, the SCS and SCEPTRE databases 202 and 204, collecting inventory parts information from the respective databases is indexed manner. The system 200 may also access, in some examples, a harmonization rules protocol 303, stored in the memory 210 or in an external system such as computers 212-1, 212-2, that provides harmonization rules and instructions to be executed by the process 300. For example, the rules protocol 303 may identify particular inventory data fields that are to be accessed from the databases 301 and particular data fields within that set that are to be examined for harmonization purposes. In some example, in particular in some examples of harmonizing two or more aircraft/air line databases, the protocol 303 may identify particular query data fields, including, (i) qualities affecting airworthiness requirements, (ii) design specifications of inventory parts, (iii) form, fit, and function of inventory parts, (iv) interchangeability of inventory parts, (v) cost, availability, quantity, (vi) inventory part usage, shelf lifetime, in-operation lifetime, (vii) relationship to other databases, (viii) integration to part maintenance program, (ix) similar or equivalence of part numbers, for example, as defined by an external database or look-up table or as set by the respective database materials management systems; (x) design specifications. These, and other, data fields may correspond to inventory parts commonly including in such databases, including airplane parts, engine parts, product materials, or other parts, and their specifications.

In the illustrated example, the protocol 303 configures the process 300 to harmonize the inventory parts across the SCS and SCEPTRE databases based primarily on two parts identifiers associated with a manufacturers parts number (MPN), namely the Parts Control Number (PCN) stored the SCS database 202 and the Maintenance & Engineering (M&E) value stored in the SCEPTRE database 204. Both of these values tend to correspond to the originating manufacturer and OEM part numbers. The process 300 may, however, use any suitable inventory identifying values for harmonization. For the illustrated example, at 304, the system 200 identifies inventory parts based on their PCN and M&E values, respectively, and compiles those values and related data fields into a comparison database that may be stored in the memory 210 and that may be made accessible and viewable by a user in graphical display and user interface. The comparison database may be executed in a FileMaker application also executing on the computer 206.

To harmonize inventory data, the process 306 automatically determines a Harmonization Category value (also termed a Part Harmonization Category) for the inventory data. In some examples, the Harmonization Category indicates the completeness of a harmonization attempt, and may be represented by a set of numbered categories. In other examples, the Harmonization Category indicates an assurance measure of the accuracy of the harmonization and may be a scored valued from 0-100.

In examples illustrated herein the process 300 seeks to assign one of three different Harmonization Categories to the various inventory parts. "Harmonization Category 1" (herein also listed as "Category 1") indicates parts are those parts that are harmonized together and grouped under a single common parts identifier. In some examples, that grouped parts identifier is a newly assigned parts number chosen to differentiate the part from other parts in a harmonization database. In other examples, the grouped parts identifier is either the existing PCN number or, as is the case in various examples described herein, the M&E number. This later harmonization technique, as may be defined by the protocol 303, is useful as it maintains one of the native databases as the default fields database. "Harmonization Category 2" (herein also listed as "Category 2") indicates parts that cannot be harmonized and therefore are maintained, in the harmonization database, using their separate assigned PCN and M&E numbers. "Harmonization Category 3" (herein also listed as "Category 3") indicates parts that may be harmonized, but that require further action to complete or authorize harmonization. For the parts in this latter category that cannot be harmonized, if it is determined, either by an operator, or automatically by a scrubbing operation, that the parts cannot be harmonized even after further action, then the parts are reassigned from Harmonization Category 3 to Harmonization Category 2.

To facilitate categorization, in some examples, process 300 performs two types of dispositions on the inventory data in the comparison database, an automated disposition and an engineering disposition. For automated dispositions, the system 200 is able to analyze PCN and M&E values and automatically assign them to Harmonization Categories 1, 2, or 3, based on policy rules in the protocol 303, through a category assignment process at 306. At 306, the process 300 may also identify which inventory parts may be harmonized using an automated disposition and which parts are to use a engineer disposition. For the former inventory parts, at a block 308, the system 200 performs an automatic disposition, e.g., either harmonizing the parts into a harmonization database 307 (which may also be called, in some examples, a material harmonization database) as may be done for expendable parts identified as Category 1 or providing separate listings for the parts, in the harmonization database, as may be done for expendable and non-expendable Category 2 parts. Automatic disposition results in the computer 206 automatically updating the harmonization database 307.

For the second type of dispositions on the comparison database, e.g., engineering disposition, those parts not harmonized at block 308, block 310 identifies and submits the remaining parts in the comparison database for a supervised disposition. At block 310, the computer 206 then handles the supervised (e.g., engineer) dispositions as set by the protocol 303. For example, the protocol 303 may impose engineering level oversight on the harmonization process for non-expendable parts, non-expendable parts that do not have an exact match between PCN and M&E, or any other category of parts comparisons. At block 312, in the illustrated example, the computer 206 awaits an engineering disposition, for example, in the form of one or more separate confirmation checks, that are to be performed by an engineer 311. While these confirmation checks are described as performed by an engineer, it will be understood by persons of ordinary skill in the art that such confirmation checks, and thus dispositions may be performed in a fully automated manner on the computer 206, partially automated manner, or manual manner, and that the reference to an "engineer disposition" as used throughout this disclosure is intended to include all three types of dispositions.

Once the automated and engineering disposition processes have been completed, then the computer 206 may, in some examples, communicate the dispositions and results of the harmonization to an external system, via block 314, such as a parts management system, maintenance system, repair system, procurement system, and historical database.

Figure 4A:
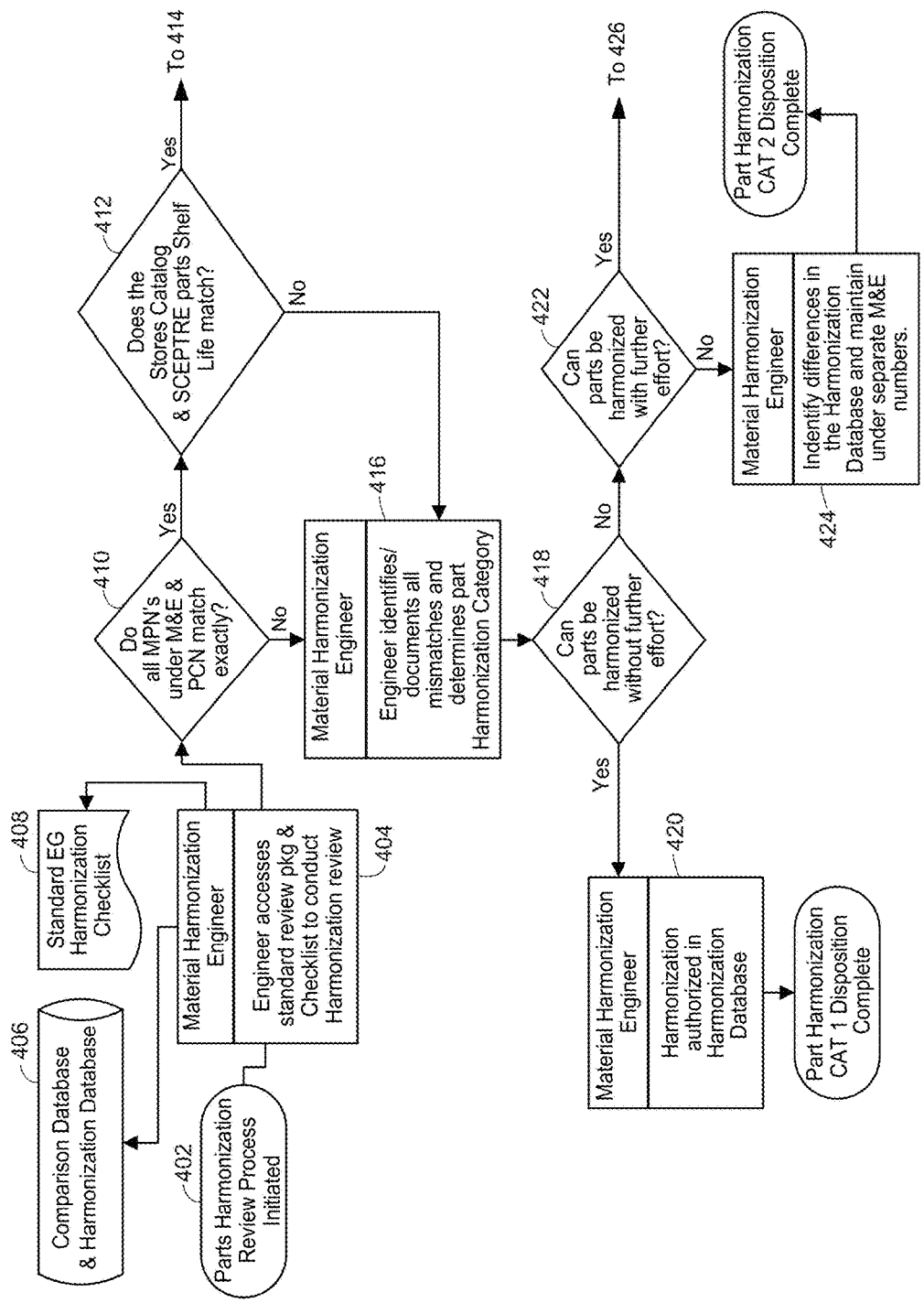
FIGS. 4A and 4B are process flow diagrams as may be implemented by the material harmonization system of FIG. 1 in accordance with an example implementation of FIG. 3, specifically as applied to example expendable inventory data, in accordance with an example.
Figure 4B:
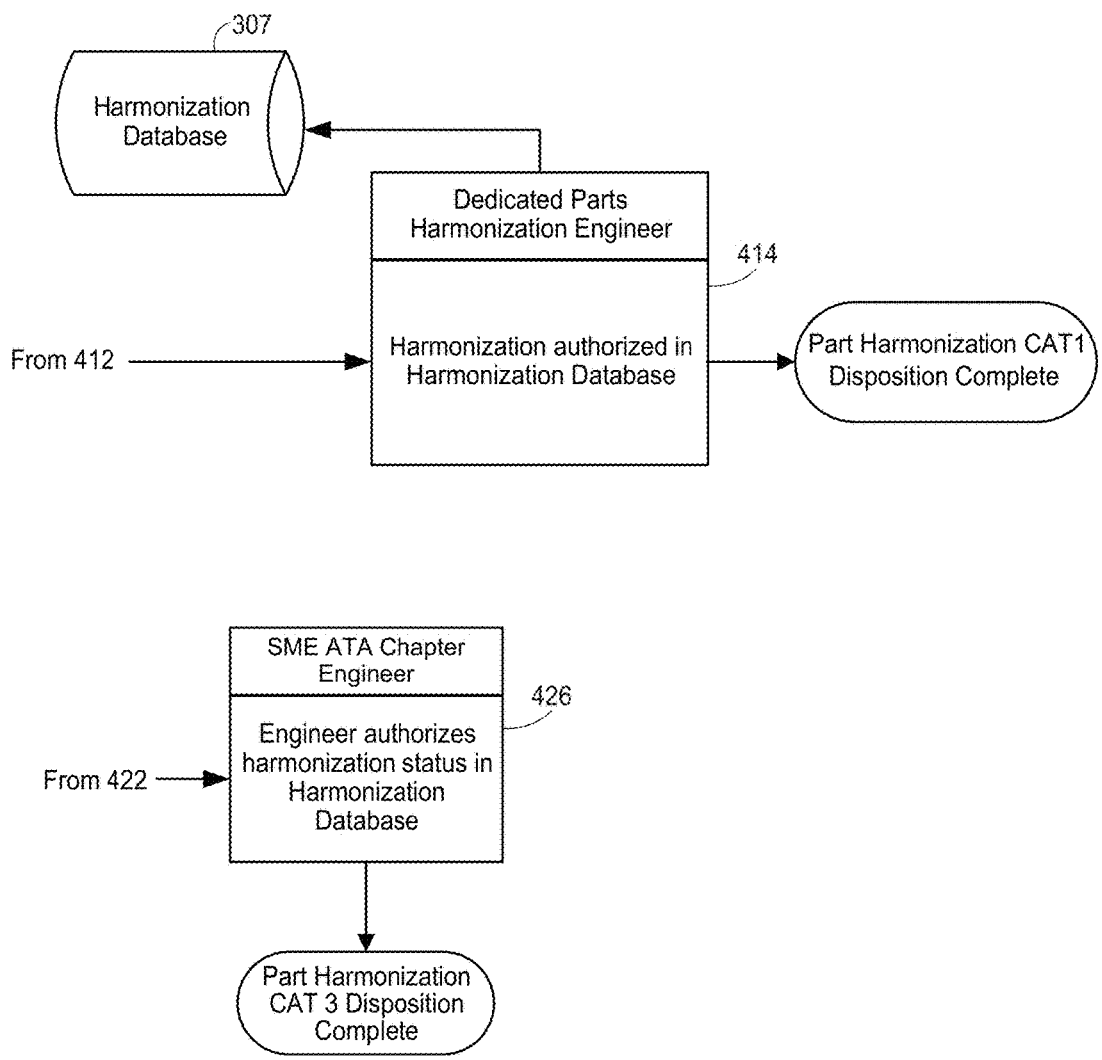

FIGS. 4A and 4B illustrate a more detailed example of a harmonization process 400 for an expendable part as may be performed as part of the execution of the block 310. The process 400 is initiated, at a block 402, to assess at least parts in each of the respective native databases and determine a part Harmonization Category (Category 1, Category 2, or Category 3), where at least one of the parts, from the native databases is determined to be expendable by the system 200 or is labeled expendable within the respective native database. In other examples, a policy manager system or a protocol like 303 may be included within the system 200 to identify those parts are expendable and which ones are not.

A material harmonization engineer, at 404, accesses databases 406 and a checklist item electronic form 408 of that database. The databases 406 may include a comparison database and harmonization database, such as database B307. The comparison database may be a temporary database stored in the memory 210 for providing a graphical display comparison of parts from the respective native databases, as illustrated in examples of FIGS. 6-13 below. The harmonization database depicted as databases 406 may be stored in the memory 210, maybe connected via a network, as in 214, or may be a copy of the later as stored in the memory 210. In any event, the system at 404 access stored parts numbers and determines, at a block 410, whether all of the identified manufactured part numbers from block 306 have matching M&E and PCN match part numbers. If yes, then at a block 412, the computer 206 further determines whether the SCS and SCEPTRE parts sheets have other matching data fields, as set for the by the protocol 303, for example, whether the parts have matching shelf life indicators. If yes, then the harmonization between the parts is authorized (414) for disposition and stored in the materials harmonization database 307, after which the harmonization process is completed for this part.

If, instead, at block 410 is determined that the exact match does not exist between the PCN and M&E numbers, then, as set forth by an example protocol, the material harmonization engineer identifies all mismatches and determines a Harmonization Category for the mismatched parts, at a block 416. If the parts can be harmonized without further information (418), then the material harmonization engineer authorizes harmonization (420) and disposition is complete. As used throughout this disclosure the "material harmonization engineer" may be executed manually or automatically by the computer 206, in some examples.

If the parts identified at 416 cannot be identified, then it is determined whether the parts can be harmonized with further effort (422). If they cannot, then the material harmonization engineer identifies differences in the harmonization database 307 and maintains the parts with separate part numbers. For example, the PCN number may be converted to a new M&E number that is stored in the harmonization database 307, via block 424. If further effort, i.e., further data analysis, comparisons, queries, etc. can be performed to harmonize the parts, then the engineer authorizes execution of those further efforts and harmonization into the harmonization database 307 is established, via block 426, after which the process completes.

The engineer dispositions performed in accordance with the present techniques, whether part of an initial engineer review, part of a secondary confirmation check, or other imposed check, may be used to dynamically determine future automated processes. For example, the computer 206 may create a harmonization script by tracking, during run time, checks performed by an engineer and developing a scripting instruction, self-executing instruction, or the like that may be automatically performed during future harmonizations.

Figure 5A:
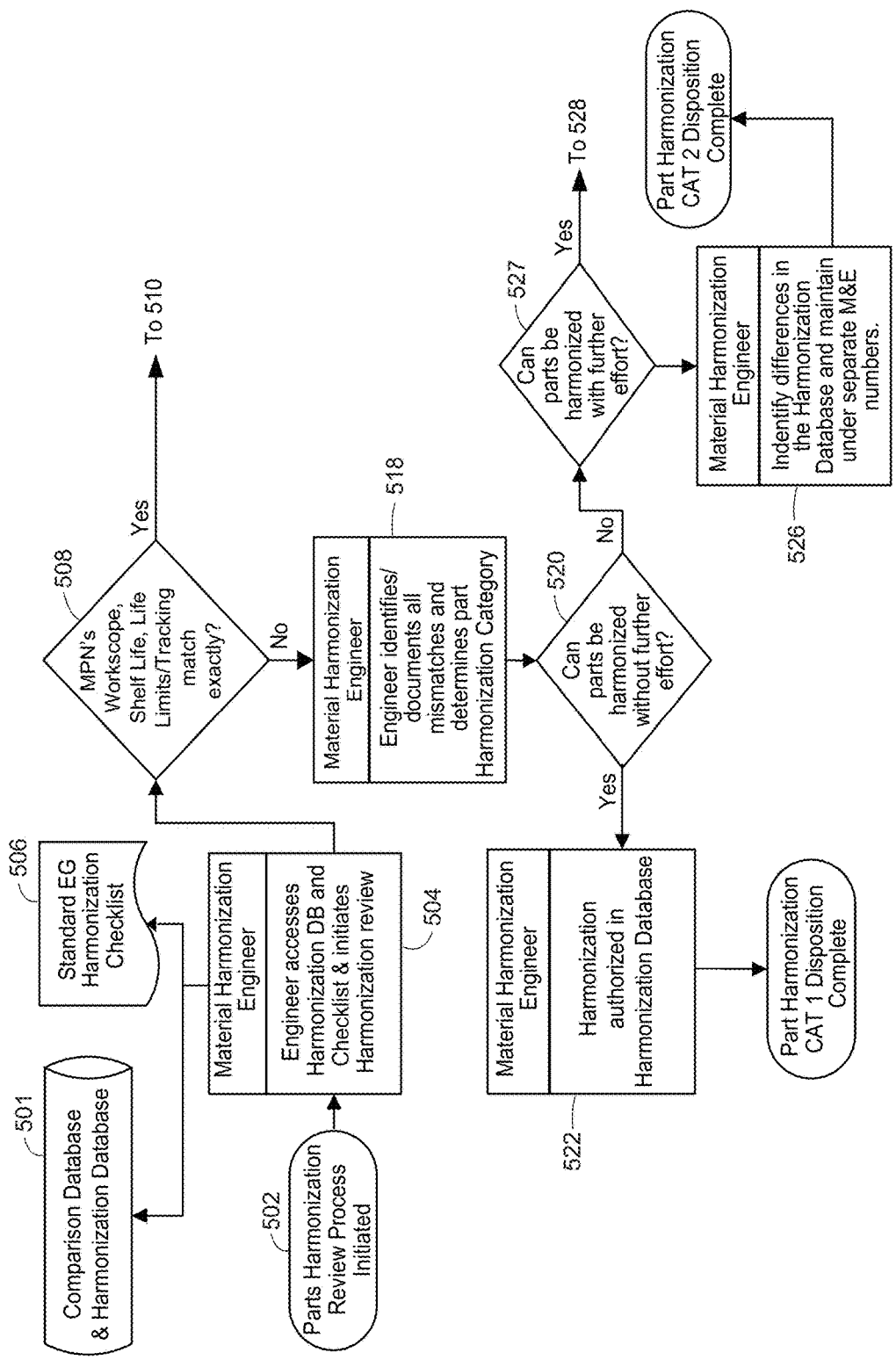
FIGS. 5A and 5B are process flow diagrams as may be implemented by the material harmonization system of FIG. 1 in accordance with an example implementation of FIG. 3, specifically as applied to example non-expendable inventory data, in accordance with an example.
Figure 5B:
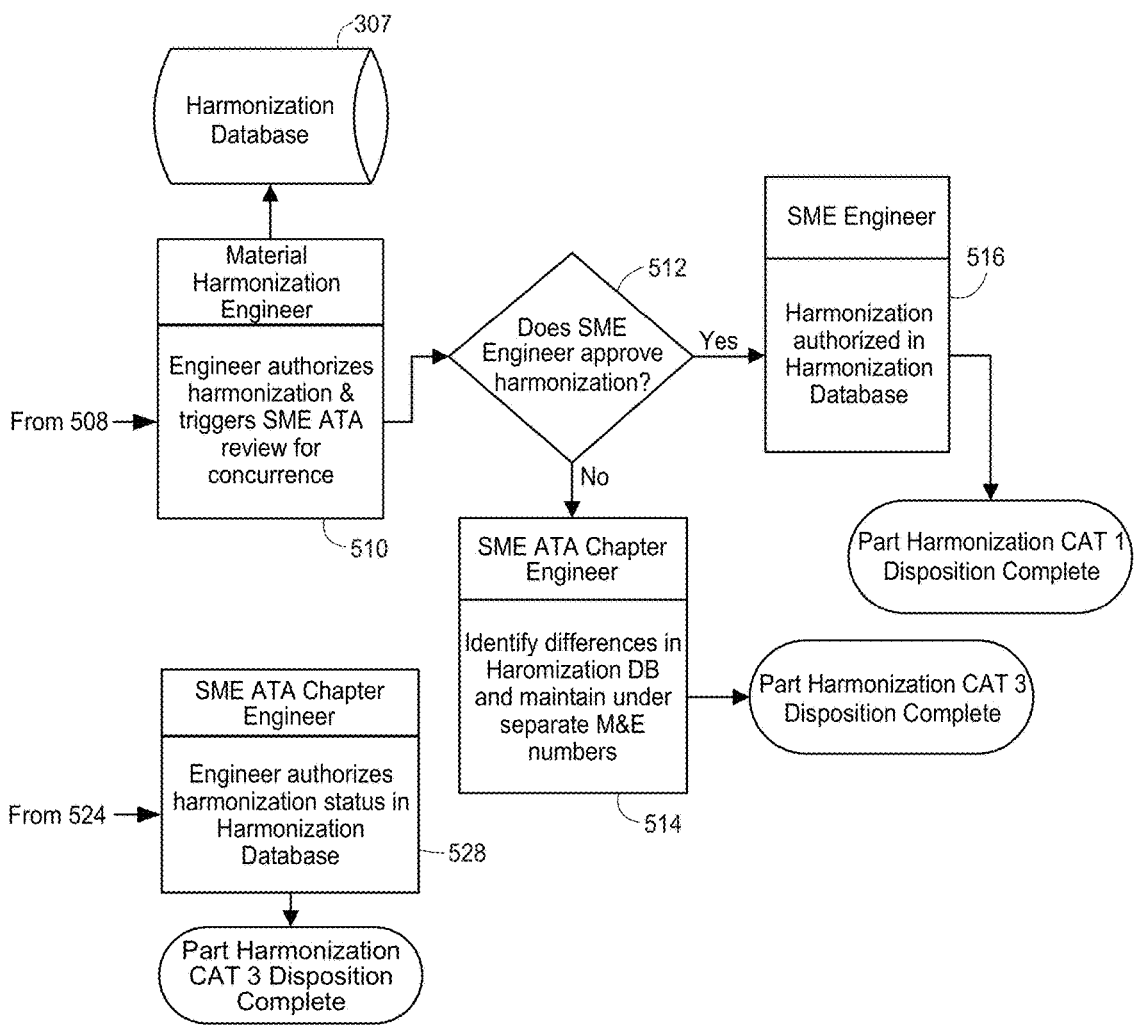

FIGS. 5A and 5B illustrate a more detailed example of a harmonization process 500 that may be executed by the block 310 for a non-expendable part. The process 500 is initiated, at 502, to assess at least two parts to determining a part Harmonization Category (Category 1, Category 2, or Category 3), where at least one of the parts from the native databases is determined to be non-expendable by the system 200 or is labeled non-expendable within the respective native database. For example, in the SCS database the part number may have an identifier code indicated rotatable (ROT), recoverable (REC), or recoverable control system line replaceable units (RCS). In other examples, a policy manager system or the protocol 303 may identify the non-expendable parts.

A material harmonization engineer, at 504, accesses comparison database and harmonization databases 501 and a checklist item electronic form 506 and determines, at a block 508, whether pre-identified match fields, such as manufacturing part numbers, workscope, shelf life, and life limits/tracking match exactly. If yes, then at a block 510, the material harmonization engineer authorizes harmonization and triggers, per a policy manager, a secondary review (e.g., an SME ATA review) for concurrence. The concurrence is provided by way of example and is optional in some examples, while in other examples, may be performed by another reviewer or reviewer protocol, whether manually or automatically implemented to provide verification of the engineer disposition. After storage of the parts in the harmonization database 307, control is passed to a block 512 where it is determined if an SME engineer is to approve the harmonization. If not, then the parts (via 514) are maintained individually in the harmonization database 307, for example, with the PCN part given a new M&E number and stored in the harmonization database 307 as a separate part. If, instead, the SME engineer does approve the harmonization, then the parts (via 516) are harmonized together, for example, under a single M&E entry in the harmonization database 307.

If, instead, at block 508 it is determined that the exact match of the pre-identified data fields does not exist, then the material harmonization engineer, identifies all mismatches and determines a Harmonization Category for the mismatches, at 518. If the parts can be harmonized without further information (520), then the material harmonization engineer authorizes harmonization (522) and disposition is complete.

If it is determined (via 524) that the parts cannot be harmonized with further effort, then the material harmonization engineer identifies differences (526) in the harmonization database 307 and maintains the parts with separate part numbers. If the parts can be further harmonized, then control is passed to a secondary authorization check, the engineer performs those further efforts and authorizes harmonization into the harmonization database 307, at 528.

Figure 6:
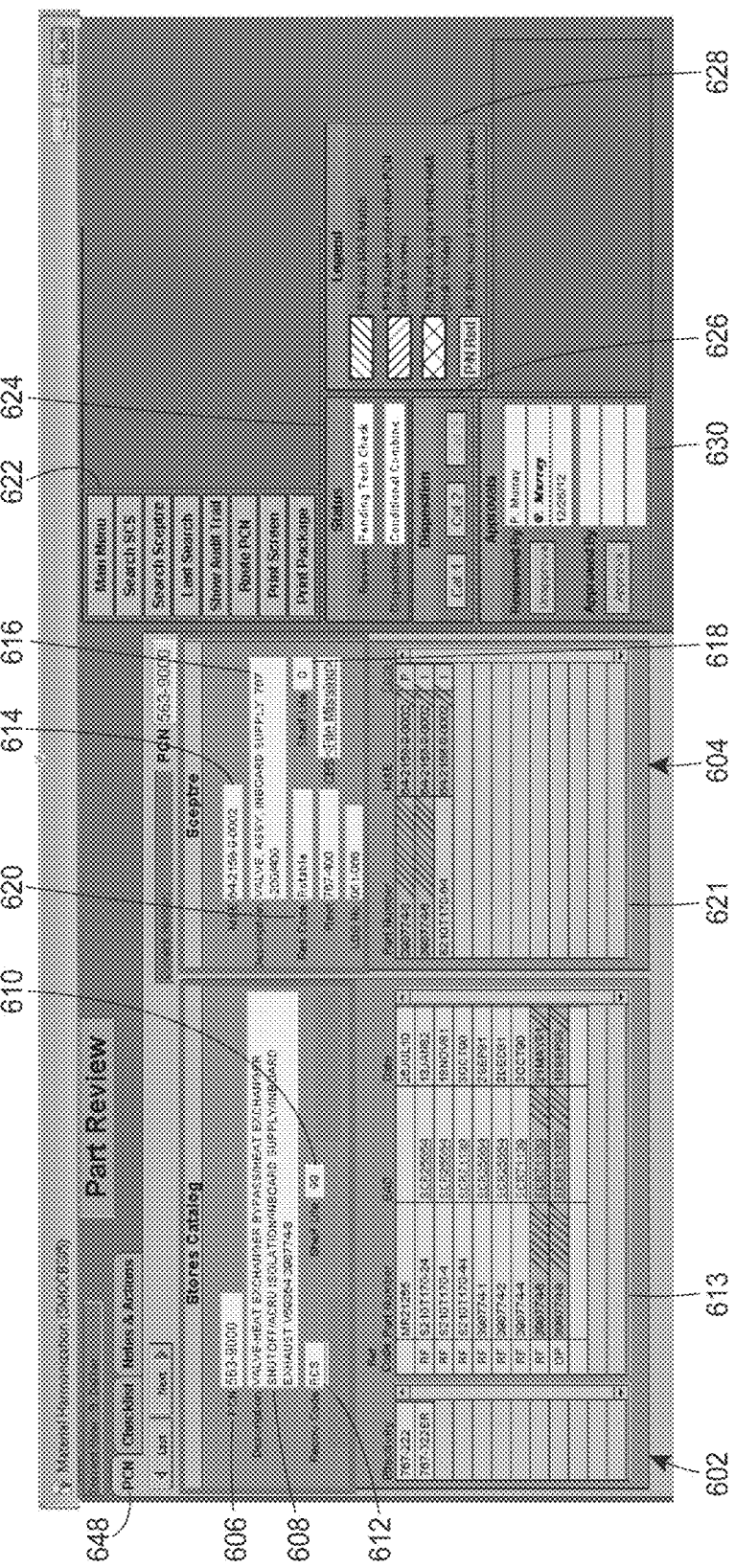
FIG. 6 is an example depiction of a graphical display automatically generated by the system of FIG. 2 to represent a combination database and harmonization categorization that may be displayed by a graphical user interface.

FIG. 6 illustrates an example disposition graphical display interface 600 that may be presented by the system 200 as part of the harmonization process and, more particular, to present inventory parts information, the determined Harmonization Categories, and any further data fields and instructions as a graphical display on the monitor 232.

Through the system 200, the user is able to pull up the database interface 600 by performing a search (not shown) for particular stored fields, e.g., a manufacturing part number search, a PCN search, or an M&E search. Such searches may be based on Harmonization Category, status, or other stored data features, as well.

The interface 600 depicts PCN inventory data in window 602 and M&E inventory data in window 604. The window 602 includes a PCN number field 606, a description box 608, a shelf life field 610, and a field 612 identifying whether the corresponding PCN is expendable/non-expendable, as defined for the SCS database. A part number box 613 illustrates the various part numbers stored in the SCS database that correspond to the PCN number in field 606. Correspondingly, the window 604 includes an M&E field 614, a description field 616, a shelf life field 618, and an expendable/non-expendable field 620. A part number box 621 illustrates the various part numbers stored in the SCEPTRE database that correspond to the M&E number in field 614.

A navigation panel 622 is provided to allow the user to navigate through the disposition display interface 600 using a series of select buttons that would take the user to a main menu, to screen for performing a search of the SCS database or a search of the SCEPTRE database, a return to a last search, or an audit trial indicating the history of harmonization dispositions for PCN and M&E numbers. The panel 622 also allows a user to select a button to route a particular harmonization disposition to another engineer, for purposes of final disposition approval or review, or request a print of the screen or a print of the entire harmonization build up for the selected PCN and M&E numbers.

A status panel 624 identifies the status of the harmonization candidates displayed on the screen and may be used to flag to an engineer whether the harmonization has been completed or requires further action.

A disposition panel 626 indicates the Harmonization Category (Category 1, Category 2, or Category 3) assigned by the computer 206 to the parts candidates displayed in the windows 602 and 604.

A legend panel 628 provides a color coding (or other insignia) legend to the operator or engineer, indicating where the windows 602 and 604 include a part number (P/N) and M&E match, a P/N match to M&E under another PCN (e.g., the harmonization database identifies it as a relationship between the Stores Catalog PCNs and SCEPTRE M&E #'s that have an exact match of the manufacturer part number(s), a P/N match under another M&E, and SCS P/N that cannot be harmonized with a corresponding inventory part in the SCEPTRE database, indicating that the SCS P/N is to be added to the Harmonization Database.

An approval panel 630 is used to record names of disposition engineer and any secondary engineer required to provide concurring approvals.

Graphical displays as may be presented under various different conditions, by the computer 206, as part of the harmonization process are depicted in FIGS. 6-13, and described below.

Figure 7:
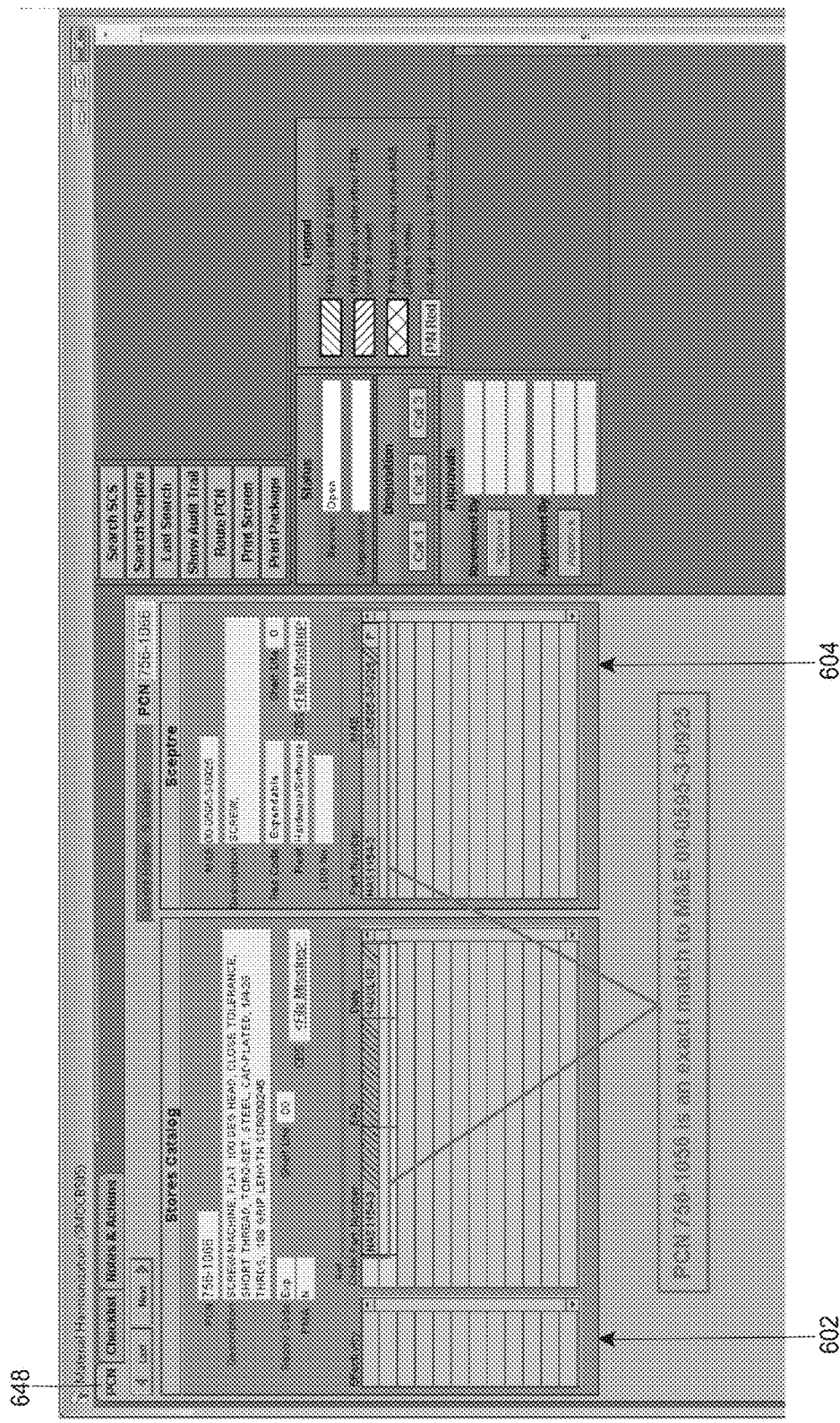
FIG. 7 is another example depiction of a graphical display generated by the system of FIG. 2, in accordance with an example.

FIG. 7 illustrates the graphical display 600 where there is an exact match between a PCN number in the window 602 and an M&E number in the window 604, where each window includes a single, expendable part. For the illustrated example, the computer 206 may automatically categorize and harmonize the entries into a harmonization database, e.g., by block 308.

Figure 8:
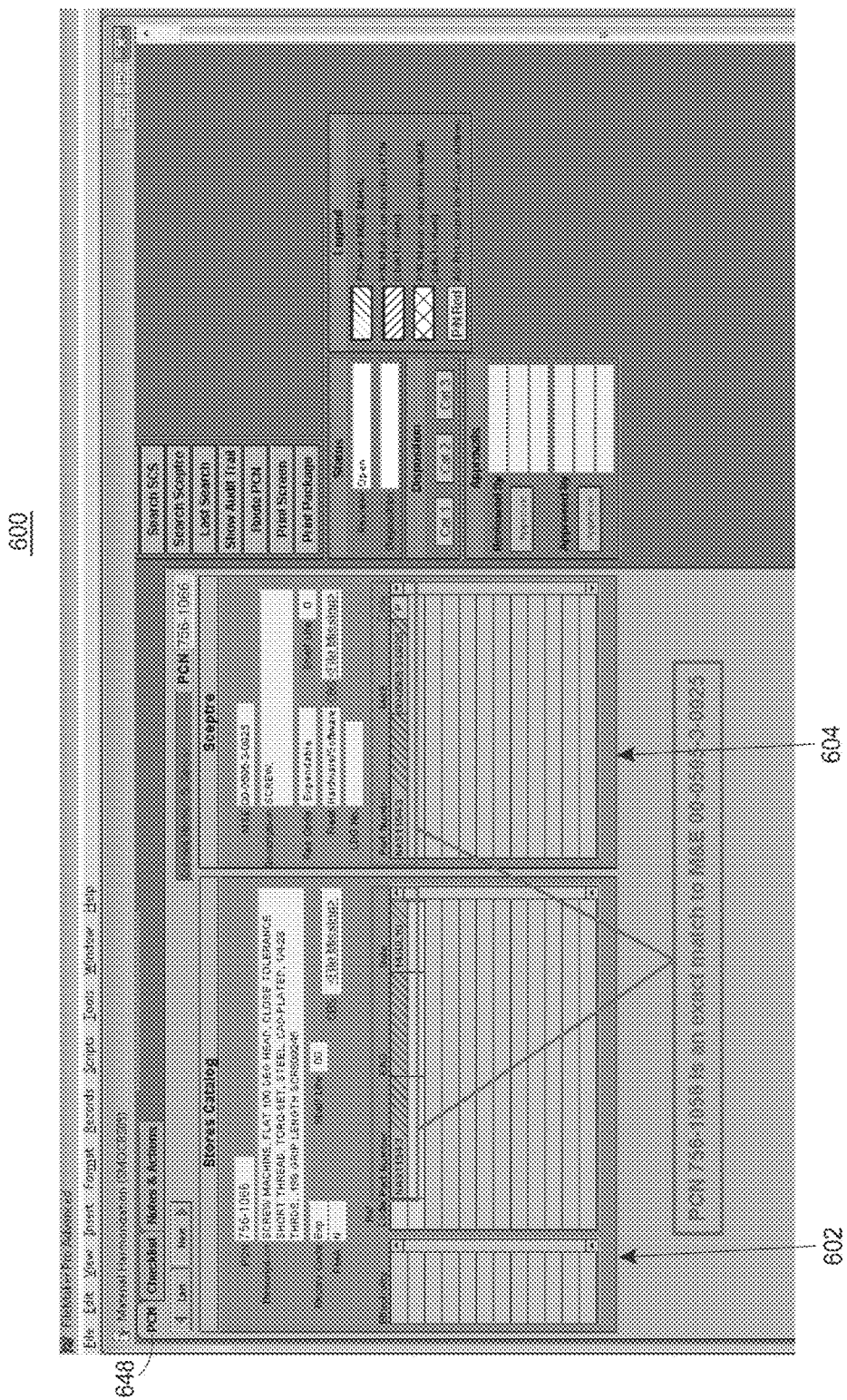
FIG. 8 is another example depiction of a graphical display generated by the system of FIG. 2, in accordance with an example.

FIG. 8 illustrates the graphical display 600 where there is an exact match between a PCN number in the window 602 and an M&E number in the window 604 for a non-expendable part, which according to an example protocol may further require engineer disposition prior to harmonization, e.g., by the blocks 310 and 312.

Figure 9:
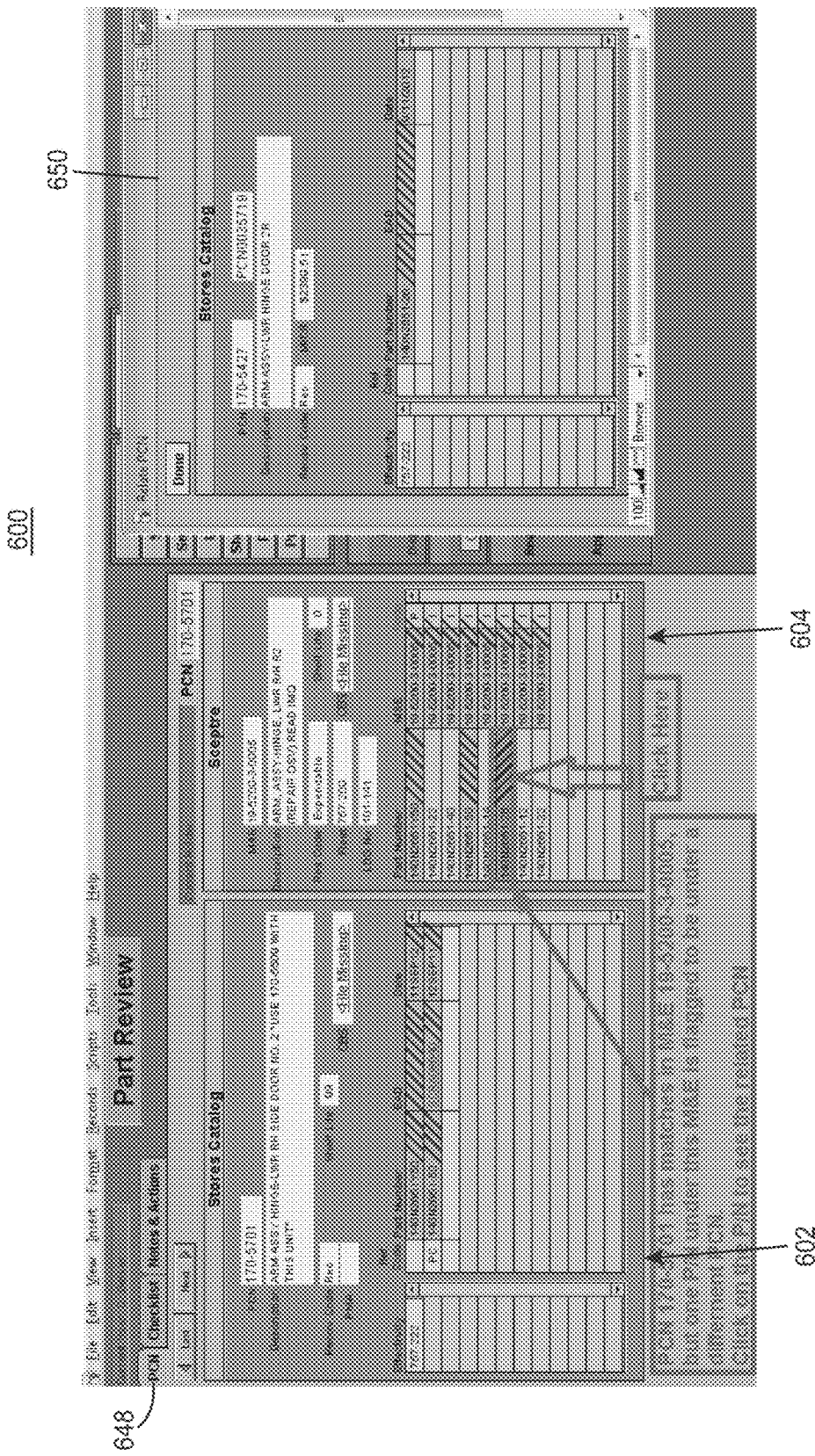
FIG. 9 is another example depiction of a graphical display generated by the system of FIG. 2, in accordance with an example.

FIG. 9 illustrates the graphical display 600 where there is a match but between multiple PCN numbers and a single M&E number. For example, the PCN 170-5701 is determined, by the computer 206, to have one part number that matches M&E 19-5200-3-0005, but one of the part numbers under that M&E has been flagged by the harmonization process of the computer 206 to be under a different PCN number. By clicking on the hyperlink of that part number a window 650 pops up indicating the other PCN number, PCN 170-5427, associated with that the M&E part number.

Figure 10:
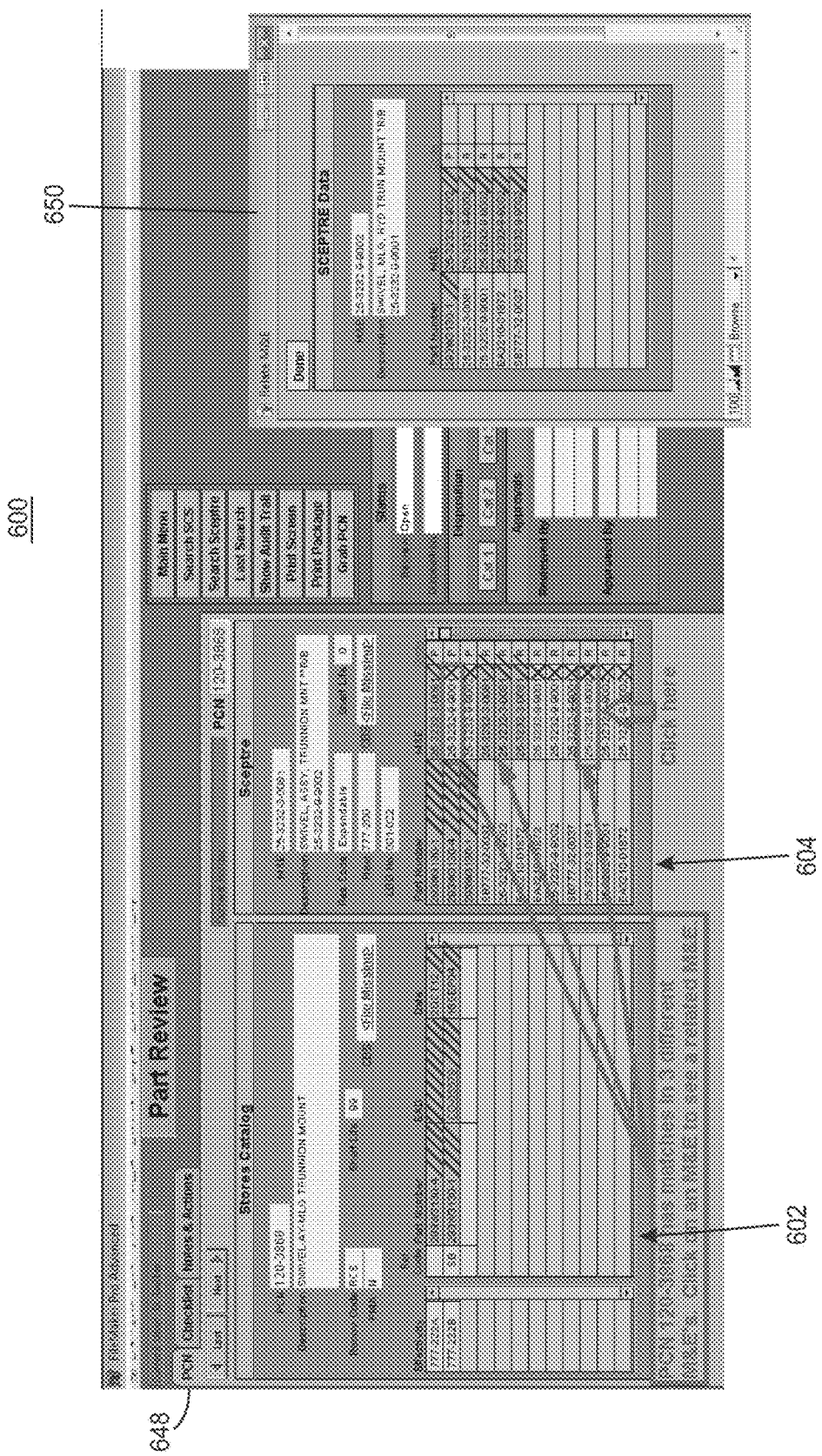
FIG. 10 is another example depiction of a graphical display generated by the system of FIG. 2, in accordance with an example.

FIG. 10 illustrates the graphical display 600 where there is a match but between a single PCN number and multiple M&E numbers. The PCN 120-3868 is determined, by the computer 206, to match three different part number under the M&E 25-3232-3-0081. By clicking on the hyperlink of one of the M&E part numbers the window 650 pops up indicating related M&E part numbers. When clicking on the multiple part number in an indicated (e.g., colored) block, (see 650) the PCN, M&E match is shown for that MPN and its relationship. In this situation, the protocol may instruct that an engineer disposition is to occur before harmonization can occur.

Figure 11:
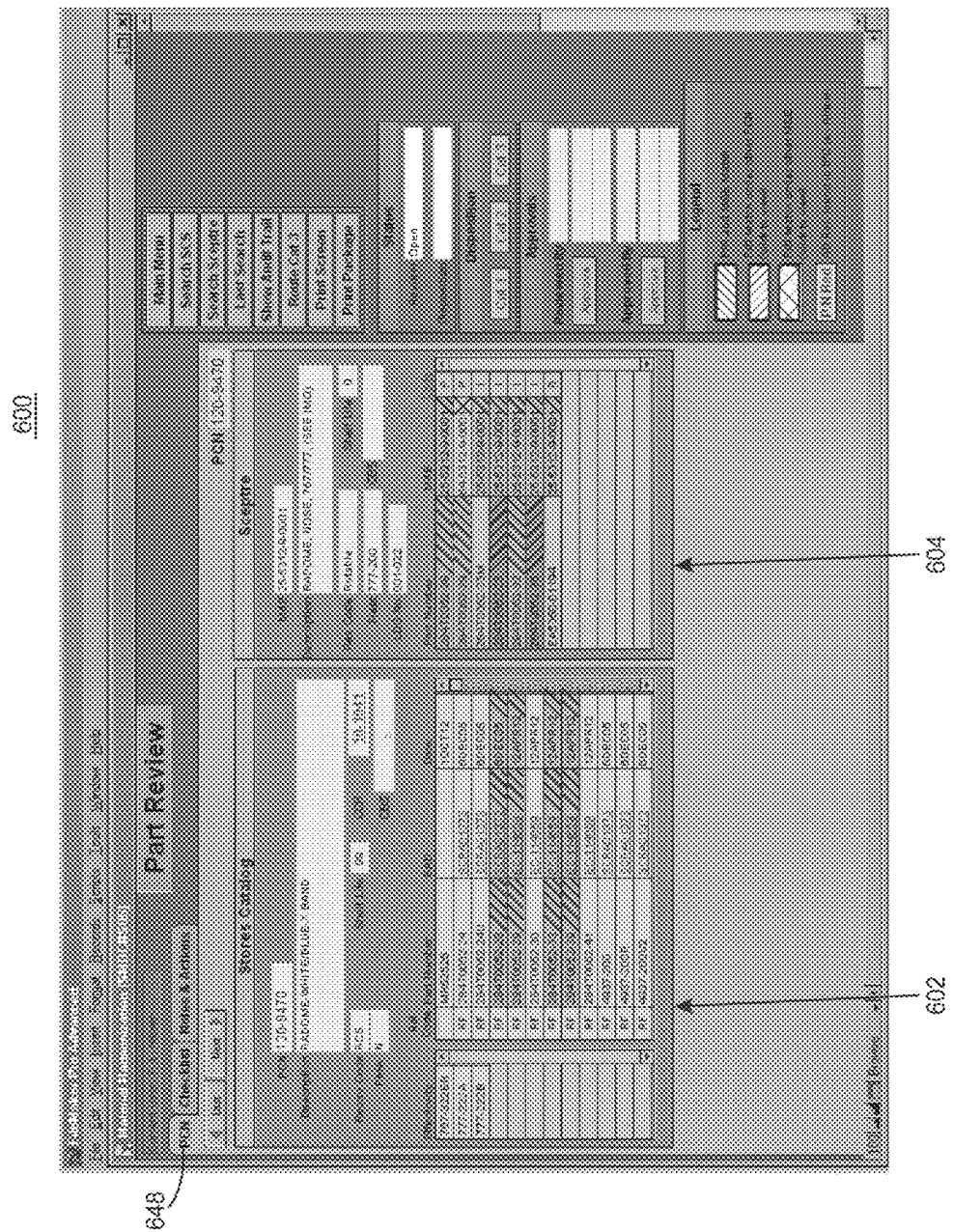
FIG. 11 is another example depiction of a graphical display generated by the system of FIG. 2, in accordance with an example.

FIG. 11 illustrates the graphical display 600 where there is a match but between multiple PCN numbers and multiple M&E numbers. In this situation, an engineer would go through and examine each of the identified parts and determine disposition of the identified parts.

In any of the examples of FIGS. 8-11, the protocol may instruct the system 200 that an engineer disposition is to occur before the harmonization process can be completed. In each instance, the engineer may perform further checks to determine if harmonization is feasible, for example, by examining the part numbers, descriptions available by clicking on the part numbers, a Checklist tab 660, a Notes & Actions tab 662, both discussed further below, or other data to resolve the harmonization.

Figure 12:
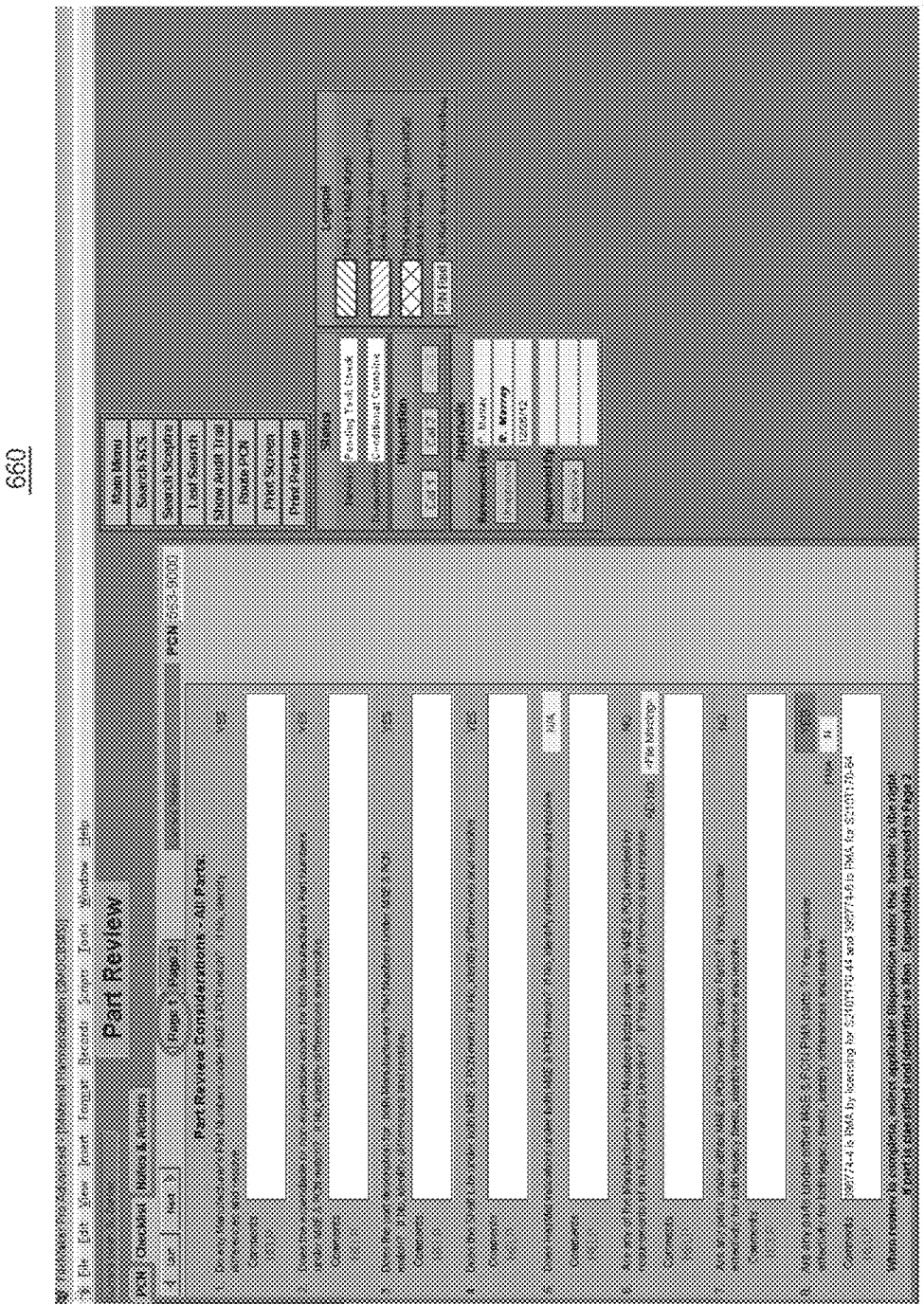
FIG. 12 is another example depiction of a graphical display generated by the system of FIG. 2 to display a checklist to a user, in accordance with an example.

The above-described panels and windows are displayed under a Parts Number tab 648. FIG. 12 illustrates an example graphical depiction under the Checklist tab 660. In the illustrated example, the Checklist tab 660 includes series of questions and corresponding answer boxes and answer toggle buttons for the engineer to complete as part of an engineer disposition and before the system 200 completes the harmonization process and populating of the part numbers in the harmonization database. FIG. 13 illustrates an example graphical depiction under the Notes & Actions tab 662. In the illustrated example, the Notes & Actions tab 662 includes a listing of actions required for disposition, with notes for each of the actions. In this way, the tab 662 may be used to record actions for a secondary engineer review to complete the disposition process and harmonization by the system 200.

FIG. 14 illustrates a post harmonization process 700 as may be implemented by the system 200 to address changes in native databases as inventory parts information is added or updated thereto. A database update manager, at 702, accesses the SCS and SCEPTRE databases, labeled collectively 704, on a periodic basis defined by a data collection policy, such as nightly, weekly, or monthly. The update manger access the harmonization database 307 as well. All database entries are collected and provided to an update filter, at 706, that identifies changes, additional, and deletions, in the native databases in comparison to the previously stored harmonization 307.

In the illustrated example, the system 200 will await a harmonization process, such as 300 before, updating the harmonization database 307 with the changed information. In the illustrated example, the process 700 automatically determines if the harmonization has occurred with respect to the changed data (block 708). If not, then the data in the existing in the harmonization database 307 is updated to reflect that source data changes have occurred and to flag such changes for engineering disposition, at a block 710. In other examples, an automated disposition is also performed on the changed data to determine if any of the changes may be automatically categorized and provided thorough disposition.

If harmonization process has occurred then the updated data will have a Harmonization Category 2. At 712, the process 700 determines if the changed data reflects a Category 2 change, where if yes, then the harmonization database 307 is not updated (via 714) with the Category 2 change data and the update process determines if additional changes have occurred (716) to analyze additional data changes.

If, by contrast, the change data has not been labeled Category 2, then the harmonization database 307 is to be updated. At a block 718, an engineer reviews the changed data and determines if existing harmonization disposition is affected. At a block 720, the engineer then determines the appropriate update, as necessary, to an existing harmonization. In either case, whether an existing harmonization is to be updated or a new harmonization results from the change, such information is provided and stored in the harmonization database 307 before the updating process ends.

Generally, the computer 206 may provide, as part of the harmonization process, a graphical user interface (GUI) such as illustrated in FIGS. 6-13. It should be recognized that the GUI may include one or more software routines that are implemented using any suitable programming languages and techniques. Further, the software routines making up the GUI may be stored and processed within a single processing machine or, alternatively, the software routines of the GUI may be stored and executed in a distributed manner using a plurality of processing units that are communicatively coupled to each other within the asset utilization system. For example, the GUI may be incorporated as part of a web-based software routine that permits a user to view the harmonization window via a network connection, such as over the network 214.

Preferably, but not necessarily, the GUI may be implemented using a familiar graphical windows-based structure and appearance, in which a plurality of interlinked graphical views or pages include one or more pull-down menus that enable a user to navigate through the pages in a desired manner to view and/or retrieve a particular type of information. The features and/or capabilities of the above data sources may be represented, accessed, invoked, etc. through one or more corresponding pages, views or displays of the GUI. Furthermore, the various displays making up the GUI may be interlinked in a logical manner to facilitate a user's quick and intuitive navigation through the displays to retrieve a particular type of information or to access and/or invoke a particular capability of the above data sources.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" or "an example" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. A computer-implemented method of harmonizing databases, the method comprising:

accessing, using a harmonization system having at least one processor and at least one memory, first inventory parts data stored in a first parts database, the first inventory parts data comprising a plurality of first inventory parts identifiers;

accessing, using the harmonization system, second inventory parts data stored in a second parts database, the second inventory parts data comprising a plurality of second inventory parts identifiers, wherein the plurality of first inventory parts identifiers and the plurality of second inventory parts identifiers have different formats;

analyzing, in the harmonization system, the first inventory parts data against the second inventory parts data using a harmonization rules protocol executed by the harmonization system and assigning a harmonization category value to each entry in the first inventory parts data, the harmonization category value defined by the harmonization rules protocol and indicating (i) an entry in the first inventory data is harmonizable with one or more entries in the second inventory data, (ii) an entry in the first inventory data is not harmonizable with any entry in the second inventory data, and (iii) an entry that is conditionally harmonizable with one or more entries in the second inventory data;

in response to the assigned harmonization category value, forming a harmonization database containing harmonization database entries containing, at least, the entries assigned harmonization category value (i) and/or (ii);

determining, using the harmonization rules protocol executed by the harmonization system, for each of the category value (i) entries in the harmonization database, a harmonized inventory part identifier as one of the corresponding first inventory part identifier, the second inventory part identifier, or a newly assigned inventory part identifier, each harmonized inventory part identifier being stored in the formed harmonization database;

visually depicting, using the harmonization system, an indication for at least those entries in the formed harmonization database having the harmonization category value (iii) in a graphical display, for subsequent conditional harmonization treatment; and storing the harmonization database in a communications network accessible manner that allows a user to access the harmonization database and perform the subsequent conditional harmonization treatment using the communications network.

2. The method of claim 1, further comprising,
depicting, using the harmonization system, an indication of the assigned harmonization category value for all entries.

3. The method of claim 1, wherein analyzing the first inventory parts data against the second inventory parts data comprises:
identifying a first parts number field in the first inventory parts data and a second parts number field in the second inventory parts data; and
determining a likelihood of similarity between the first parts number field and the second parts number field.

4. The method of claim 3, further comprising determining the likelihood of similarity by looking for matching data stored in the first parts number field and in the second parts number field.

5. The method of claim 4, wherein the matching data comprises a sufficient portion of the first parts number field and a sufficient portion of the second parts number field.

6. The method of claim 4, wherein the matching data comprises the entire first parts number field and the entire second parts number field.

7. The method of claim 1, wherein forming the harmonization database entries comprises:
for each entry in the first inventory parts data having a harmonization category value (i) indicating that the entry in the first inventory parts data may be harmonized with one or more entries in the second inventory parts data, creating a combined entry in the harmonization database.

8. The method of claim 1, wherein forming the harmonization database entries comprises:
for each entry in the first inventory parts data having a harmonization category value (ii) indicating that the entry in the first inventory parts data may not be harmonized with any entry in the second inventory parts data, creating separate entries in the harmonization database.

9. The method of claim 1, further comprising for each of the entries assigned harmonization category value (iii), submitting the entries for conditional harmonization treatment.

10. The method of claim 9, further comprising awaiting an indication from a user of the harmonization system of completion of the conditional harmonization treatment.

11. The method of claim 1, further comprising communicating the formation of harmonization database entries to a maintenance system, a repair system, and/or a procurement system.

12. The method of claim 1, wherein at least one of the second parts database or the first parts database comprises a plurality of databases.

13. A non-transitory computer-readable storage medium having stored thereon a set of instructions, executable by a processor, for harmonizing databases, the instructions comprising:

instructions for accessing first inventory parts data stored in a first parts database, the first inventory parts data comprising a plurality of first inventory parts identifiers;

instructions for accessing second inventory parts data stored in a second parts database, the second inventory parts data comprising a plurality of second inventory parts identifiers, wherein the plurality of first inventory parts identifiers and the plurality of second inventory parts identifiers have different formats;

instructions for analyzing the first inventory parts data against the second inventory parts data using a harmonization rules protocol and assigning a harmonization category value to each entry in the first inventory parts data, the harmonization category value defined the harmonization rules protocol and indicating (i) an entry in the first inventory parts data that is harmonizable with one or more entries in the second inventory parts data, (ii) an entry in the first inventory parts data that is not harmonizable with any entry in the second inventory parts data, and (iii) an entry that is conditionally harmonizable with one or more entries in the second inventory parts data;

instructions for, in response to the assigned harmonization category value, forming a harmonization database having harmonization database entries containing the entries assigned harmonization category value (i) and/or (ii);

instructions for determining, using the harmonization rules protocol executed by the harmonization system, for each of the category value (i) entries in the harmonization database, a harmonized inventory part identifier as one of the corresponding first inventory part identifier, the second inventory part identifier, or a newly assigned inventory part identifier, each harmonized inventory part identifier being stored in the formed harmonization database;

instructions for visually depicting, using the harmonization system, an indication for at least those entries in the formed harmonization database having the harmonization category value (iii) in a graphical display, for subsequent conditional harmonization treatment; and instructions for storing the harmonization database in a communications network accessible manner that allows a user to access the harmonization database and perform the subsequent conditional harmonization treatment using the communications network.

14. The non-transitory computer-readable storage medium of claim 13, having stored thereon a set of further instructions comprising:
instructions for depicting, using the harmonization system, an indication of the assigned harmonization category value for all entries.

15. The non-transitory computer-readable storage medium of claim 13, wherein the instructions for analyzing the first inventory parts data against the second inventory parts data comprises:
instructions for identifying a first parts number field in the first inventory parts data and a second parts number field in the second inventory parts data; and
instructions for determining a likelihood of similarity between the first parts number field and the second parts number field.

16. The non-transitory computer-readable storage medium of claim 13, having stored thereon a set of further instructions comprising instructions for determining the likelihood of similarity by looking for matching data stored in the first parts number field and in the second parts number field.

17. The non-transitory computer-readable storage medium of claim 16, wherein the matching data comprises a sufficient portion of the first parts number field and a sufficient portion of the second parts number field.

18. The non-transitory computer-readable storage medium of claim 16, wherein the matching data comprises the entire first parts number field and the entire second parts number field.

19. The non-transitory computer-readable storage medium of claim 13, wherein the instructions for forming the harmonization database entries comprises:
    for each entry in the first inventory parts data having a harmonization category value (i) indicating that the entry in the first inventory parts data may be harmonized with one or more entries in the second inventory parts data, instructions for creating a combined entry in the harmonization database.

20. The non-transitory computer-readable storage medium of claim 13, wherein the instructions for forming the harmonization database entries comprises:
    for each entry in the first inventory parts data having a harmonization category value (ii) indicating that the entry in the first inventory parts data may not be harmonized with any entry in the second inventory parts data, instructions for creating separate entries in the harmonization database.

21. The non-transitory computer-readable storage medium of claim 13, having stored thereon a set of further instructions comprising, for each of the entries assigned harmonization category value (iii), instructions for submitting the entries for conditional harmonization treatment.

22. The non-transitory computer-readable storage medium of claim 21, having stored thereon a set of further instructions for awaiting an indication from a user of the harmonization system of completion of the conditional harmonization treatment.

23. The non-transitory computer-readable storage medium of claim 13, having stored thereon a set of further instructions for communicating the formation of harmonization database entries to a maintenance system, a repair system, and/or a procurement system.

24. The non-transitory computer-readable storage medium of claim 13, wherein at least one of the second parts database or the first parts database comprises a plurality of databases.

25. A system for harmonizing databases, the system comprising:
    a plurality of inventory parts electronic databases each stored on a respective database system communicatively coupled to a communication network, each inventory parts database having different formatted parts data;
    a harmonization system having at least one processor and at least one memory and communicatively coupled to the communication network to receive a plurality of different inventory parts data sets from the plurality of inventory parts databases, wherein the harmonization system is configured to:
    identify from the plurality of different inventory parts data sets, inventory parts identifiers for respective inventory parts items in the plurality of different inventory parts data sets, wherein each inventory parts identifier identifies a different part entry in one of the plurality of different inventory parts data sets;
    analyze the inventory parts identifiers using a harmonization rules protocol and assign a harmonization category value to each entry in the plurality of different inventory parts data sets, the harmonization category value indicating (i) an entry that is harmonizable with one or more other entries in the plurality of different inventory data sets, (ii) an entry that is not harmonizable with any other entry in the plurality of different inventory data sets, and (iii) an entry that is conditionally harmonizable with one or more other entries in the plurality of different inventory data sets;
    determine, using the harmonization rules protocol, for each of the category value (i) entries in the harmonization database, a harmonized inventory part identifier that is selected from one of the plurality of inventory parts databases or that is generated as a newly assigned inventory part identifier; and
    form an electronic harmonization database for storing harmonization database entries containing the entries assigned harmonization category value (i), (ii) and/or (iii) and store the harmonization database in a communications network accessible manner that allows a user to access the harmonization database and perform a conditional harmonization treatment using the communications network.

* * * * *